(12) United States Patent
Su et al.

(10) Patent No.: US 8,540,041 B2
(45) Date of Patent: Sep. 24, 2013

(54) DRIVING SYSTEM FOR ELECTRIC VEHICLE

(76) Inventors: Kuo-Hsin Su, New Taipei (TW); Ta-Yu Su, New Taipei (TW)

( * ) Notice: Subject to any disclaimer, the term of this patent is extended or adjusted under 35 U.S.C. 154(b) by 386 days.

(21) Appl. No.: 13/052,356

(22) Filed: Mar. 21, 2011

(65) Prior Publication Data
US 2012/0244980 A1    Sep. 27, 2012

(51) Int. Cl.
*B60K 1/00*    (2006.01)
(52) U.S. Cl.
USPC .......................... 180/65.51; 180/65.6; 301/6.5
(58) Field of Classification Search
USPC ................. 180/55, 65.5, 65.6; 301/6.5, 6.91, 301/6.1, 6.15; 310/67 R
See application file for complete search history.

(56) References Cited

U.S. PATENT DOCUMENTS

| | | | |
|---|---|---|---|
| 5,382,854 A * | 1/1995 | Kawamoto et al. | 310/67 R |
| 6,540,632 B1 * | 4/2003 | Wendl et al. | 475/5 |
| 8,002,060 B2 * | 8/2011 | Komatsu | 180/65.51 |
| 8,316,973 B2 * | 11/2012 | Walter et al. | 180/65.51 |

* cited by examiner

*Primary Examiner* — John Walters
*Assistant Examiner* — James Triggs
(74) *Attorney, Agent, or Firm* — Rosenberg, Klein & Lee

(57) ABSTRACT

A driving system for electric vehicle is disclosed to use a clutch switching unit for controlling a motor rotor-driven bushing to rotate a wheel hub via a direct-drive active clutch or via a set of planet gears and a reducing clutch. At the initial state after startup of the motor, the direct-drive active clutch runs idle, enabling the wheel hub to provide a low-speed high-torque output, saving power consumption. When the vehicle speed reaches a predetermined level, a control circuit drives a clutch motor to move the clutch switching unit in releasing the reducing clutch to idle the planet gears, enabling the direct-drive active clutch to be switched on so that the rotor of the motor can rotate the wheel hub directly to accelerate the vehicle speed.

8 Claims, 11 Drawing Sheets

DRIVING SYSTEM FOR ELECTRIC VEHICLE

BACKGROUND OF THE INVENTION

1. Field of the Invention

The present invention relates to vehicle driving systems and more particularly, to a driving system for electric vehicle, which uses a clutch switching unit to control a motor rotor-driven bushing in rotating a wheel hub via a direct-drive active clutch or via a set of planet gears and a reducing clutch. At the initial state after startup of the motor, the direct-drive active clutch runs idle, enabling the wheel hub to provide a low-speed high-torque output, saving power consumption. When the vehicle speed reaches a predetermined level, a control circuit drives a clutch motor to move the clutch switching unit in releasing the reducing clutch to idle the planet gears, enabling the direct-drive active clutch to be switched on so that the rotor of the motor can rotate the wheel hub directly to accelerate the vehicle speed.

2. Description of the Related Art

FIG. 11 illustrates a conventional driving system used in an electric vehicle. According to this design, the driving system comprises a motor 9 and a transmission mechanism 91. The transmission mechanism 91 comprises a driving wheel set 911 rotatable by the motor 9, a transmission wheel set 912, a transmission belt 913 coupled between the driving wheel set 911 and the transmission wheel set 912 for enabling the transmission wheel set 912 to be rotated by the driving wheel set 911, an output shaft 914 that is rotatable by the driven wheel set 911 to rotate a reducing mechanism 915 and a wheel hub 916, and a clutch 92.

The transmission wheel set 912 comprises a main transmission wheel 9121 and a sliding transmission wheel 9122. The clutch 92 controls displacement of the sliding transmission wheel 9122 subject to a centrifugal force to change the transmission radius of the transmission belt 913, achieving transmission and speed reducing.

According to the aforesaid design, the motor 9 drives the driving wheel set 911 to rotate the transmission wheel set 912 by means of the transmission belt 913, enabling the output torque to be transferred to the reducing mechanism 915 and then the wheel hub 916. By means of friction, the transmission belt 913 transfers the rotary driving force from the driving wheel set 911 to the transmission wheel set 912. This friction transmission consumes much electric power. Further, after transmission of the rotary driving power from the driving wheel set 911 to the transmission wheel set 912 through any transmission measure, the reducing mechanism 915 reduces the output speed. Thus, the motor 9 cannot perform efficiently and consumes much electric power during operation. Thus, an electric vehicle using this design of driving system is not practical for long distance application.

SUMMARY OF THE INVENTION

The present invention has been accomplished under the circumstances in view. It is the main object of the present invention to provide a driving system for electric vehicle, which enables the vehicle motor to rotate the wheel hub directly at the initial stage when it is started up, and to rotate the wheel hub through a set of planet gears and a reducing clutch after the vehicle speed reaches a predetermined level, thereby enhancing the performance and saving power consumption.

To achieve this and other objects of the invention, a driving system uses a speed sensor for sensing the vehicle speed for controlling switching between two clutches. A clutch switching unit is used to control a vehicle motor rotor-driven bushing to rotate the wheel hub via a direct-drive active clutch or via a set of planet gears and a reducing clutch. At the initial state after startup of the motor, the direct-drive active clutch runs idle, enabling the wheel but to provide a low-speed high-torque output, saving power consumption. When the vehicle speed reaches a predetermined level, the speed sensor gives a signal to a control circuit to drive a clutch motor, causing the clutch motor to drive the clutch switching unit in releasing the reducing clutch to idle the planet gears, enabling the direct-drive active clutch to be switched on so that the rotor of the motor can rotate the wheel hub directly to accelerate the vehicle speed.

DETAILED DESCRIPTION OF THE PREFERRED EMBODIMENT

Figure 1:
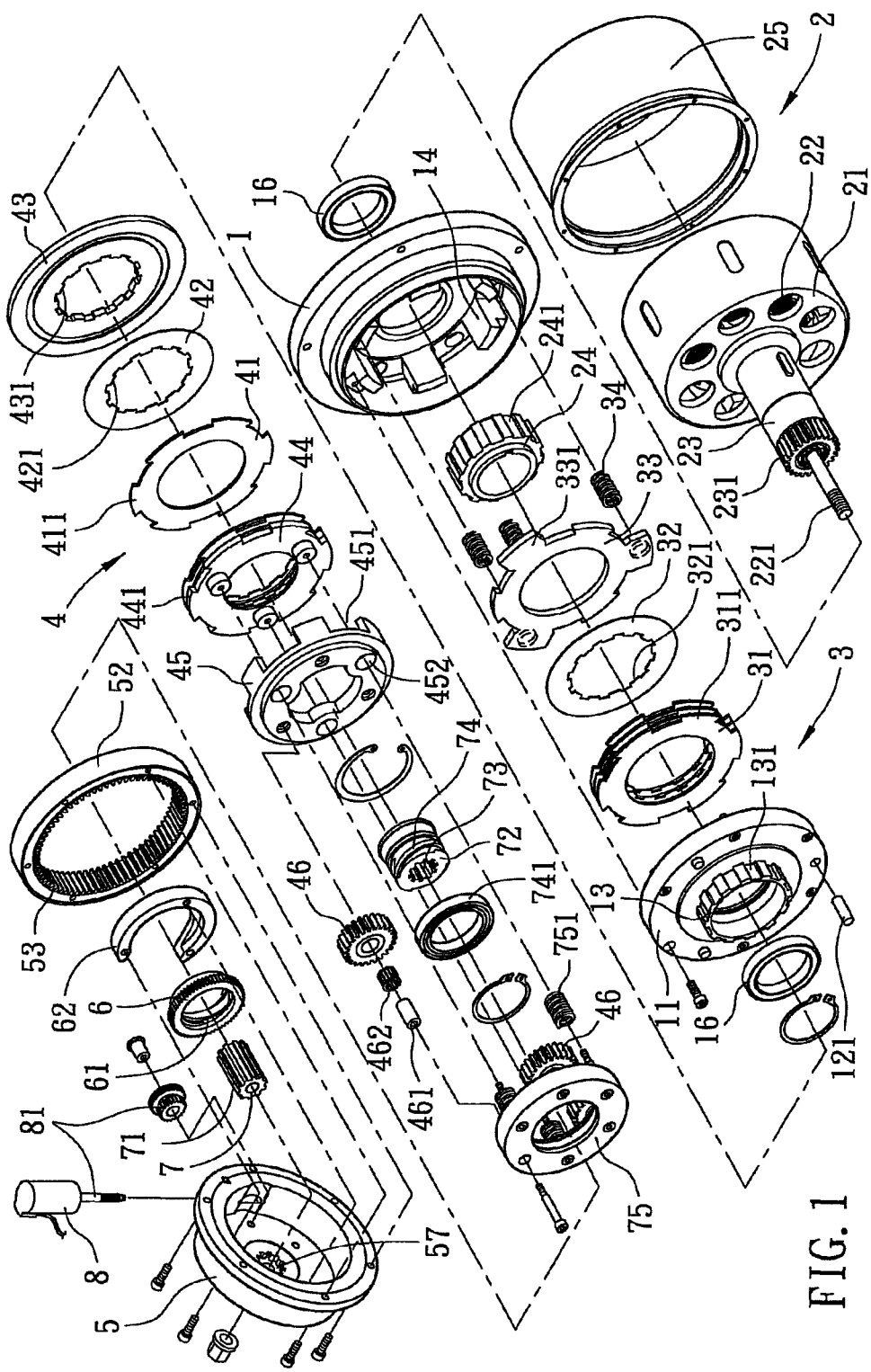
FIG. 1 is an exploded view of a driving system for electric vehicle in accordance with the present invention.
Figure 2:
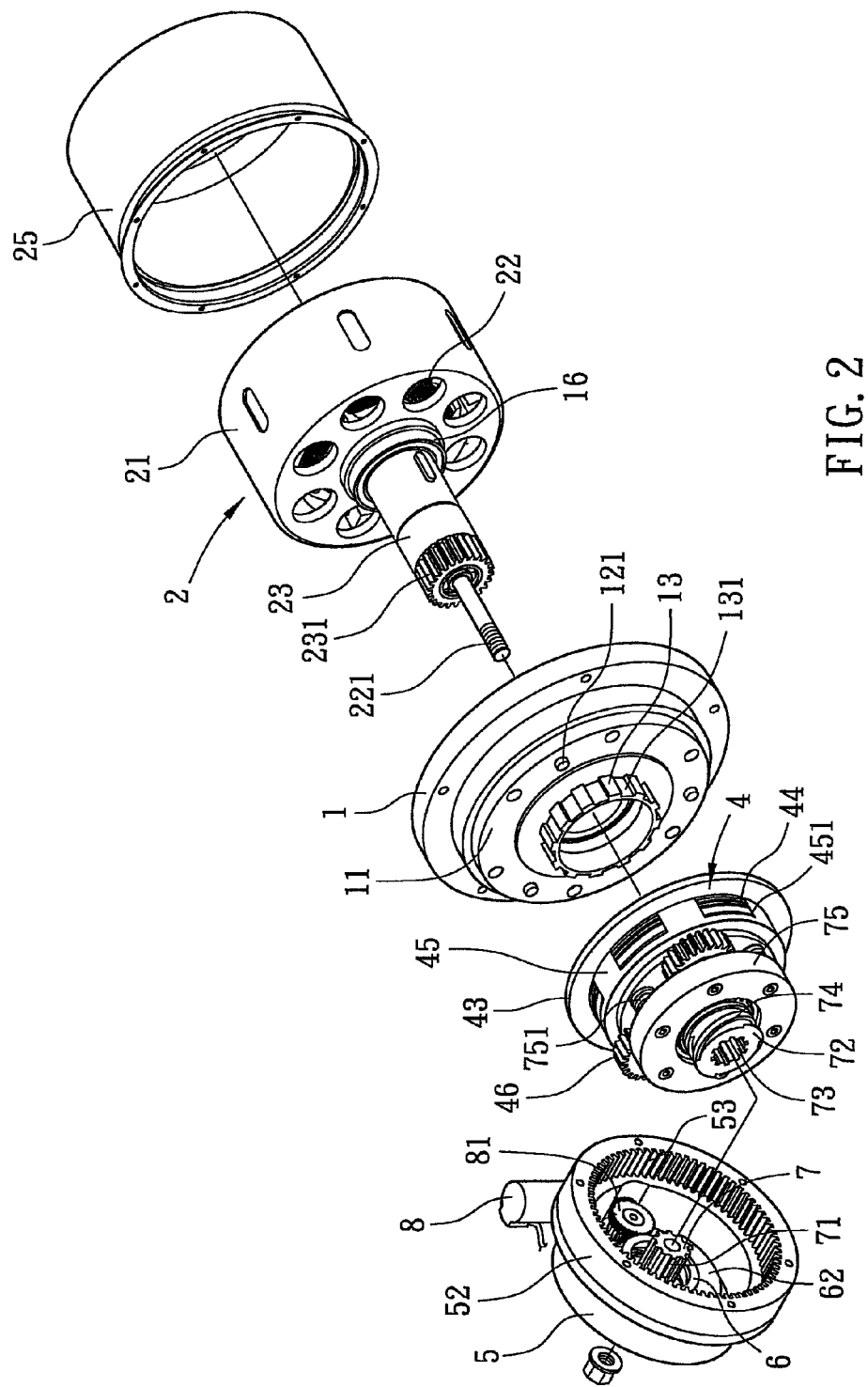
FIG. 2 is another exploded view of the present invention, illustrating the component parts of the driving system partially assembled.
Figure 3:
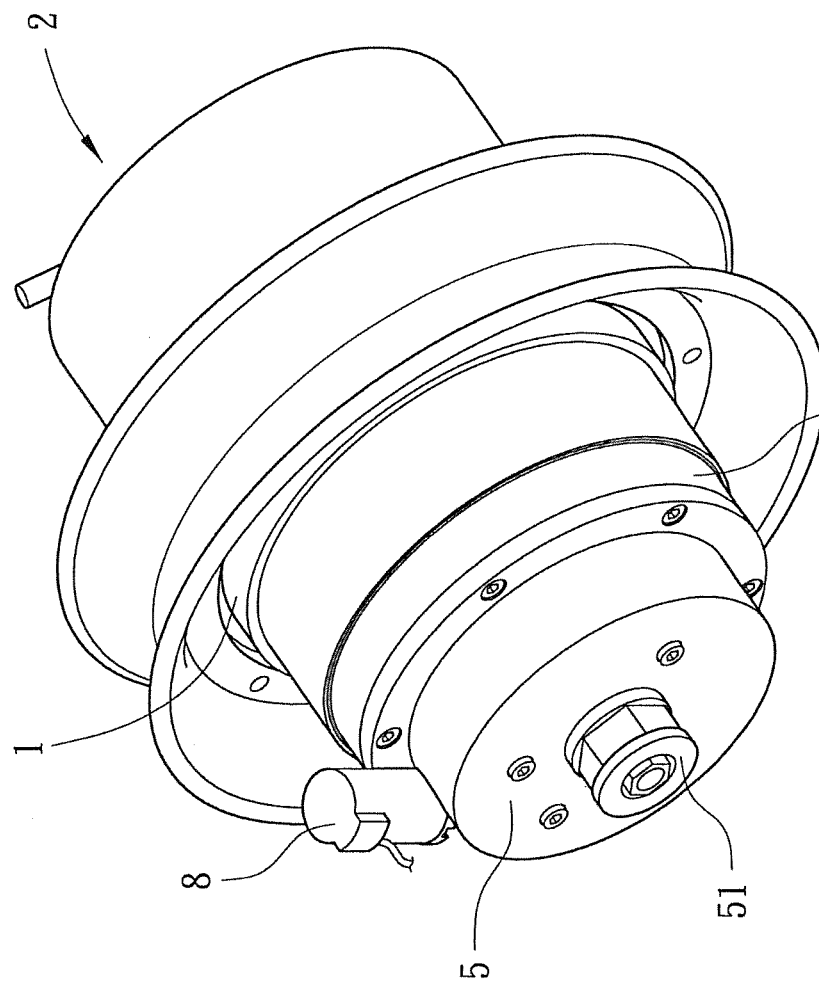
FIG. 3 is an elevational assembly view of the driving system for electric vehicle in accordance with the present invention.
Figure 4:
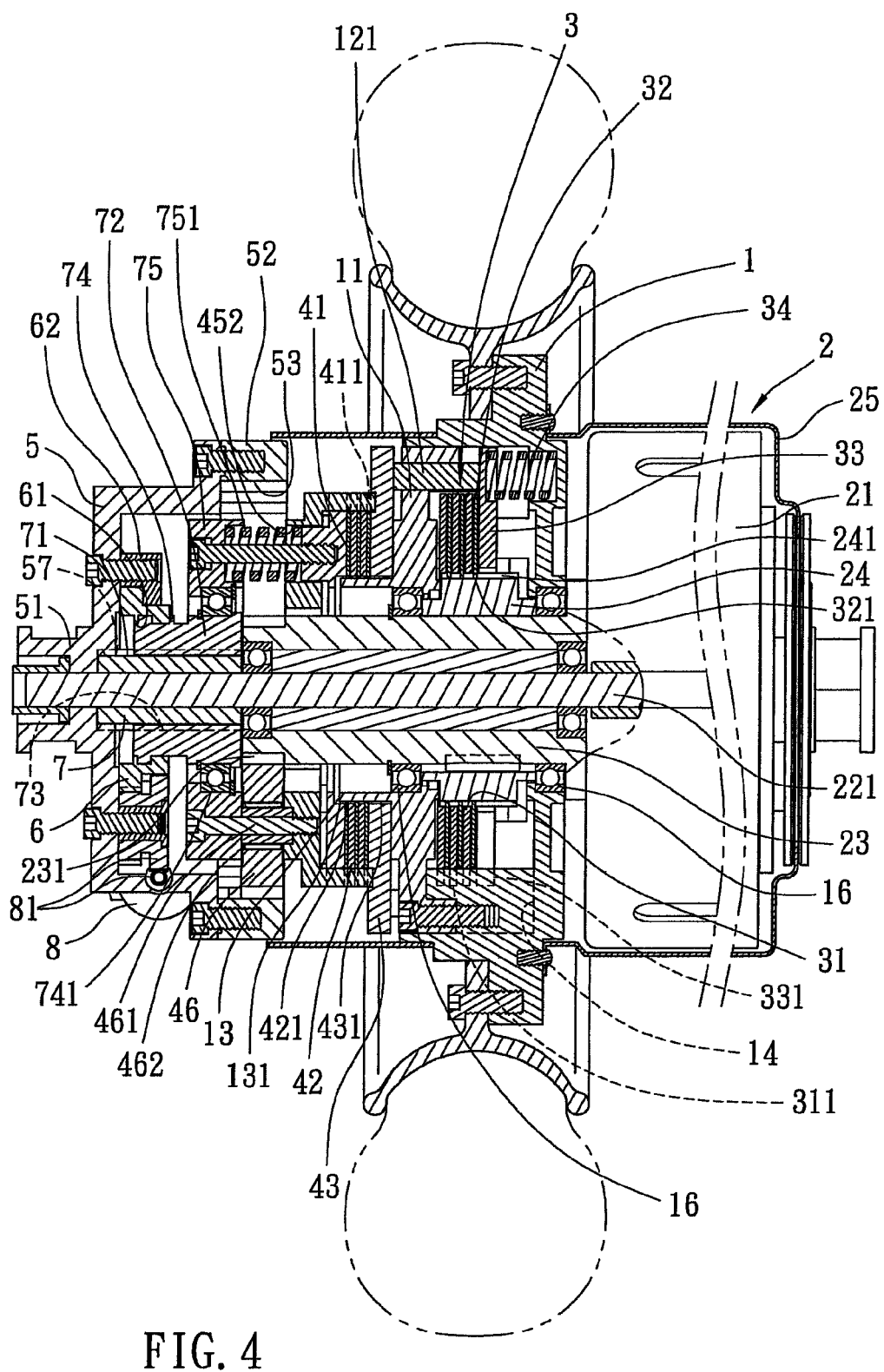
FIG. 4 is a sectional assembly view of the driving system for electric vehicle in accordance with the present invention.

Referring to FIGS. 1~4 and FIG. 10, a driving system in accordance with the present invention is shown for use in an electric vehicle for rotating the wheels of the electric vehicle, comprising a wheel hub 1, a hubcap 11, a vehicle motor 2, a direct-drive active clutch 3 mounted in the wheel hub 1, a first clutch presser plate 33, a reducing clutch 4 mounted on the outer side of the hubcap 11, a switching push-pull plate 43 set between the reducing clutch 4 and the hubcap 11, a set of planet gears 46, a bushing 23 mounted on an axle 221 of a stator 22 of the vehicle motor 2 to support the aforesaid components and a clutch switching unit. The vehicle motor 2 further comprises a housing 25, a rotor 21 accommodated in the housing 25 and adapted for rotating the wheel hub 1. At the initial stage after the vehicle motor 2 is started up, the direct-drive active clutch 3 is not forced by associating spring members 34 and runs idle, and the reducing clutch 4 is forced by respective spring members 751 to transfer the rotary driving force to the planet gear set 46 so that the wheel hub 1 is in a low-speed high-torque driving status. When the revolving speed of the wheel hub 1 reaches a predetermined value, a speed sensor 56 senses the speed and gives a signal to a control circuit 55, causing the control circuit 55 to turn on a clutch motor 8 in driving the clutch switching unit to pull apart the reducing clutch 4, and at the same time, the direct-drive active clutch 3 in the wheel hub 1 is forced by the associating spring members 34 to let the wheel hub 1 be directly rotated by the rotor 21 of the vehicle motor 2 at a high speed.

Figure 6:
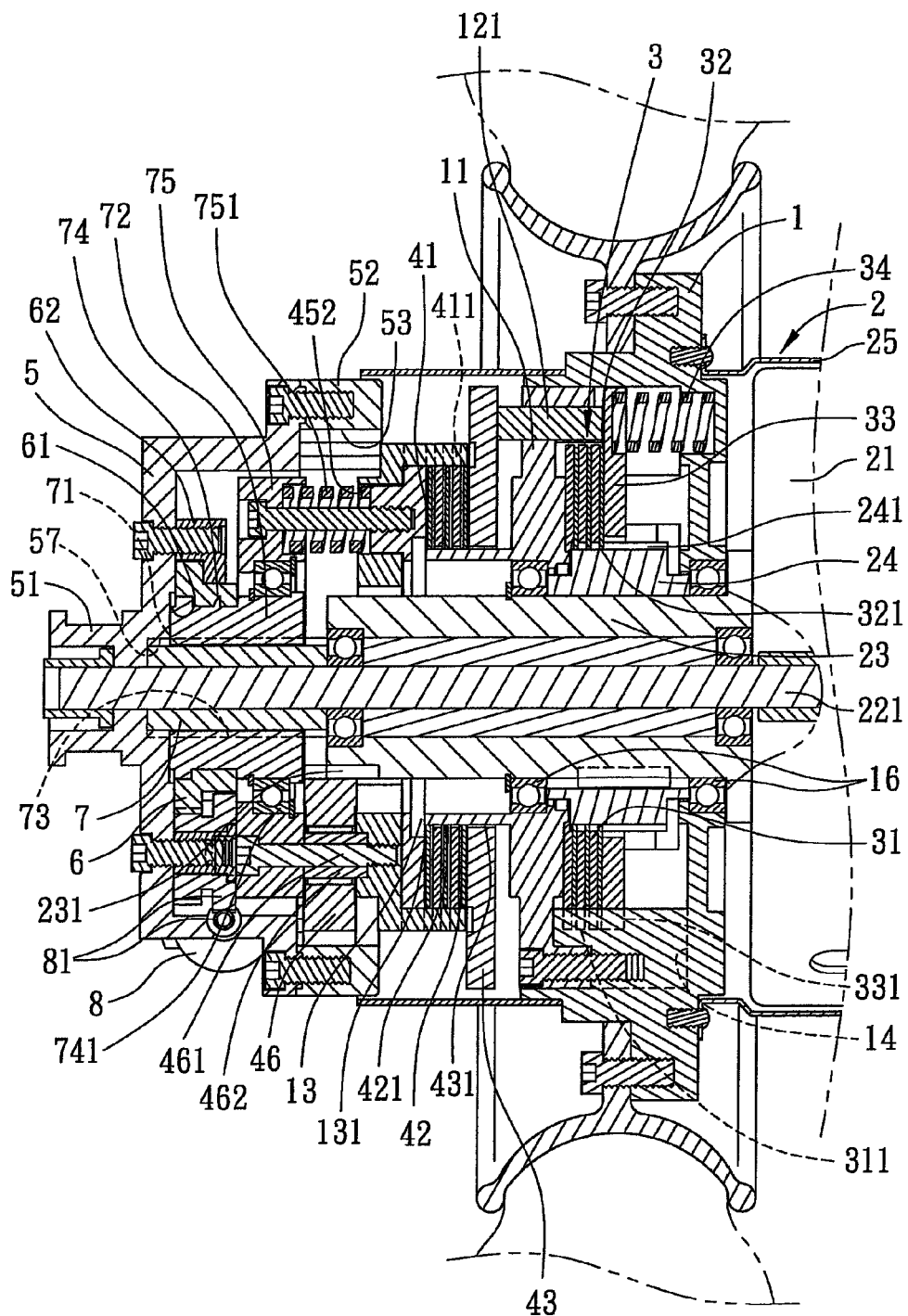
FIG. 6 is a schematic sectional view of the driving system for electric vehicle in accordance with the present invention, illustrating the first clutch presser plate compressed by the associating spring members and the direct-drive active clutch engaged with the wheel hub for direct rotation with the rotor of the vehicle motor.
Figure 7:
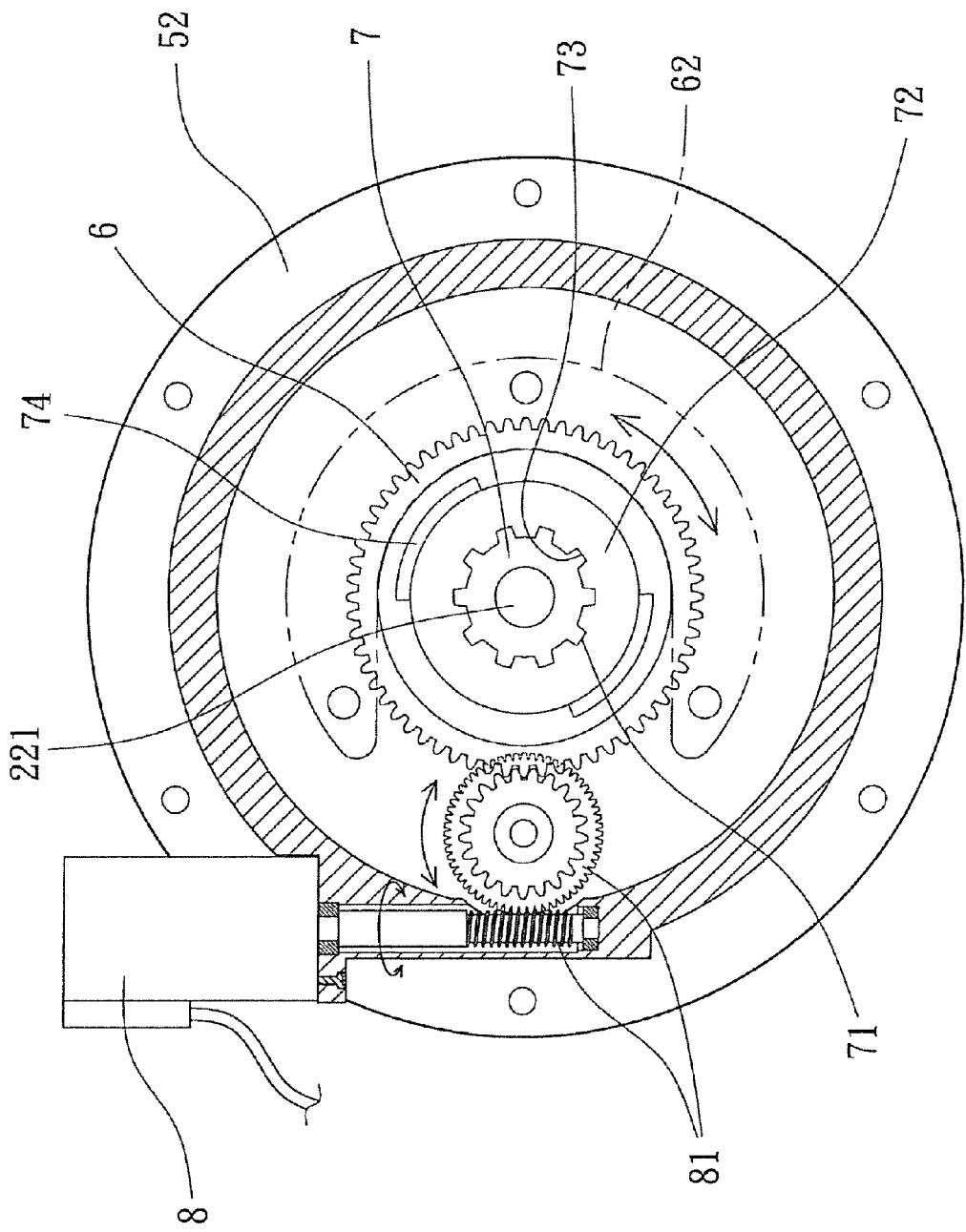
FIG. 7 is a schematic sectional view of the driving system for electric vehicle in accordance with the present invention, illustrating the axial drive gear rotated by the clutch motor.

The wheel hub 1 defines therein an accommodation space. The vehicle motor 2 is accommodated in the wheel hub 1. The bushing 23 is fixedly connected with the rotor 21 of the vehicle motor 2, having a pair of axle bearings mounted therein. The axle 221 of the stator 22 of the vehicle motor 2 is inserted through the axle bearings in the bushing 23. Thus, the rotor 21 of the vehicle motor 2 and the bushing 23 are pivotally supported on the axle 221 of the stator 22. The wheel hub 1 and the hubcap 11 are respectively mounted on the bushing 23 by a respective axle bearing 16, and rotatable relative to each other. Further, a driving wheel 24 is fixedly mounted on the bushing 23 for synchronous rotation, having a plurality of transverse grooves 241 spaced around the periphery. The direct-drive active clutch 3 comprises a clutch drive plate 31, a clutch driven plate 32, the aforesaid first clutch presser plate 33 and associating spring members 34. The clutch drive plate 31 has a plurality of radially extending peripheral teeth 311 meshed with an internal toothed engagement portion 14 of the wheel hub 1. The clutch driven plate 32 is set between the clutch drive plate 31 and the first clutch presser plate 33, having a plurality of inner teeth 321 respectively engaged into the transverse grooves 241 of the driving wheel 24. The first clutch presser plate 33 has a plurality of radially extending peripheral teeth 331 meshed with the internal toothed engagement portion 14 of the wheel hub 1. The spring members 34 are equiangularly mounted in the wheel hub 1 to impart a pressure to the first clutch presser plate 33 toward the clutch driven plate 32 and the clutch drive plate 31. The hubcap 11 is covered on the wheel hub 1 to keep the direct-drive active clutch 3 inside the wheel hub 1, having an annular flange 13 protruded from one side thereof opposite to the wheel hub 1. The annular flange 13 has a plurality of transverse grooves 131 equiangularly spaced around the periphery for the mounting of the aforesaid reducing clutch 4 and a push-pull plate 75. The reducing clutch 4 comprises a clutch drive plate 41, a clutch driven plate 42, the foresaid switching push-pull plate 43, a second clutch presser plate 44, a planet gear holder 45 and the aforesaid planet gears 46. The switching push-pull plate 43 has a plurality of inner teeth 431 respectively engaged into the transverse grooves 131 of the annular flange 13 of the wheel hub 1. The clutch driven plate 42 has a plurality of inner teeth 421 respectively engaged into the transverse grooves 131 of the annular flange 13 of the wheel hub 1. Thus, the switching push-pull plate 43 and the clutch driven plate 42 can transfer a torque to the hubcap 11 and the wheel hub 1. The clutch drive plate 41 and the second clutch presser plate 44 each have a plurality of radially extending peripheral teeth 411;441 meshed with a toothed engagement portion 451 of the planet gear holder 45 for synchronous rotation. The planet gears 46 are equiangularly and pivotally mounted on the outside wall of the planet gear holder 45 by a respective axle bearing 462 and a respective pivot pin 461. The pivot pin 461 is inserted through the associating axle bearing 462 and connected between the planet gear holder 45 and the push-pull plate 75. The planet gear holder 45 and the push-pull plate 75 are fixedly fastened together. Further, the planet gears 46 are meshed with a pinion 231 that is fixedly connected with the bushing 23 and disposed near the distal (outer) end of the axle 221 of the stator 22 of the vehicle motor 2. Further, an outer cover 5 is covered on the wheel hub 1 over the hubcap 11 to protect the reducing clutch 4. The outer cover 5 comprises an external mounting portion 51 affixed to the vehicle frame 54 of an electric vehicle (not shown), and a tooth ring 52 mounted therein. The tooth ring 52 has an internal gear 53 meshed with the planet gears 46. Subject to the functioning of the planet gears 46, the output speed of the vehicle motor 2 is reduced, and the output torque of the vehicle motor 2 is increased. Further, the aforesaid clutch switching unit is mounted inside the outer cover 5, comprising the aforesaid clutch motor 8, a worm gear set 81, a constraint member 62, a sliding guide sleeve 7, a cylindrical sliding member 72 and a push-pull plate 75. The sliding guide sleeve 7 is fixedly mounted on the axle 221 of the stator 22 of the vehicle motor 2 and engaged with a toothed end thereof into a grooved positioning portion 57 in the outer cover 5, having longitudinal grooves 71 equiangularly spaced around the periphery. The cylindrical sliding member 72 is axially slidably mounted on the sliding guide sleeve 7, having a plurality of longitudinal ribs 73 respectively slidably coupled to the longitudinal grooves 71 of the sliding guide sleeve 7 and an outer thread 74 spirally extending around the periphery thereof and meshed with an inner thread 61 of an axial drive gear 6 that is mounted in the constraint member 62 inside the outer cover 5 to revolve on its own axis. The push-pull plate 75 is mounted on the cylindrical sliding member 72 by an axle bearing 741 and a retainer (not shown). Further, spring members 751 are inserted through equiangularly spaced through holes 452 of the planet gear holder 45 and stopped between the push-pull plate 75 and the second clutch presser plate 44. When the electric vehicle is started, the cylindrical sliding member 72 is moved toward the hubcap 11 to the extent subject to a predetermined setting, causing the push-pull plate 75 to move the planet gears 46, the planet gear holder 45 and the spring members 751 in forcing the reducing clutch 4 into engagement with the hubcap 11. Thus, the wheel hub 1 is in a deceleration driving status. When the rotor 21 of the vehicle motor 2 rotates the bushing 23 as the wheel hub 1 is in the deceleration driving status, the pinion 231 is meshed with the planet gears 46 that are also meshed with the internal gear 53 of the tooth ring 52. Thus, the planet gears 46 are rotated in one same direction between the tooth ring 52 and the pinion 231, enabling the wheel hub 1 to provide the desired low-speed high-torque output (see FIG. 5), and therefore the electric vehicle is efficiently started with less power consumption. Under this deceleration driving status, the thrust pins 121 are inserted through the hubcap 11 are forced by the switching push-pull plate 43 to move the first clutch presser plate 33 and the associating spring members 34, thereby releasing the direct-drive active clutch 3 for idle running. When the revolving speed of the wheel hub 1 (the speed of the electric vehicle) reaches a predetermined level, the speed sensor 56 senses the speed and gives a signal to the control circuit 55, causing the control circuit 55 to turn on the clutch motor 8 in driving the axial drive gear 6. When the axial drive gear 6 is rotated, the cylindrical sliding member 72 is forced to move the push-pull plate 75 toward the outer cover 5, and therefore the reducing clutch 4 is released from the pressure of the associating spring members 751. At this time, the first clutch presser plate 33 of the direct-drive active clutch 3 is compressed by the associating spring members 34, allowing the wheel hub 1 to be rotated by the vehicle motor 2 directly, thereby accelerating the speed of the electric vehicle (see FIGS. 6 and 7).

Figure 5:
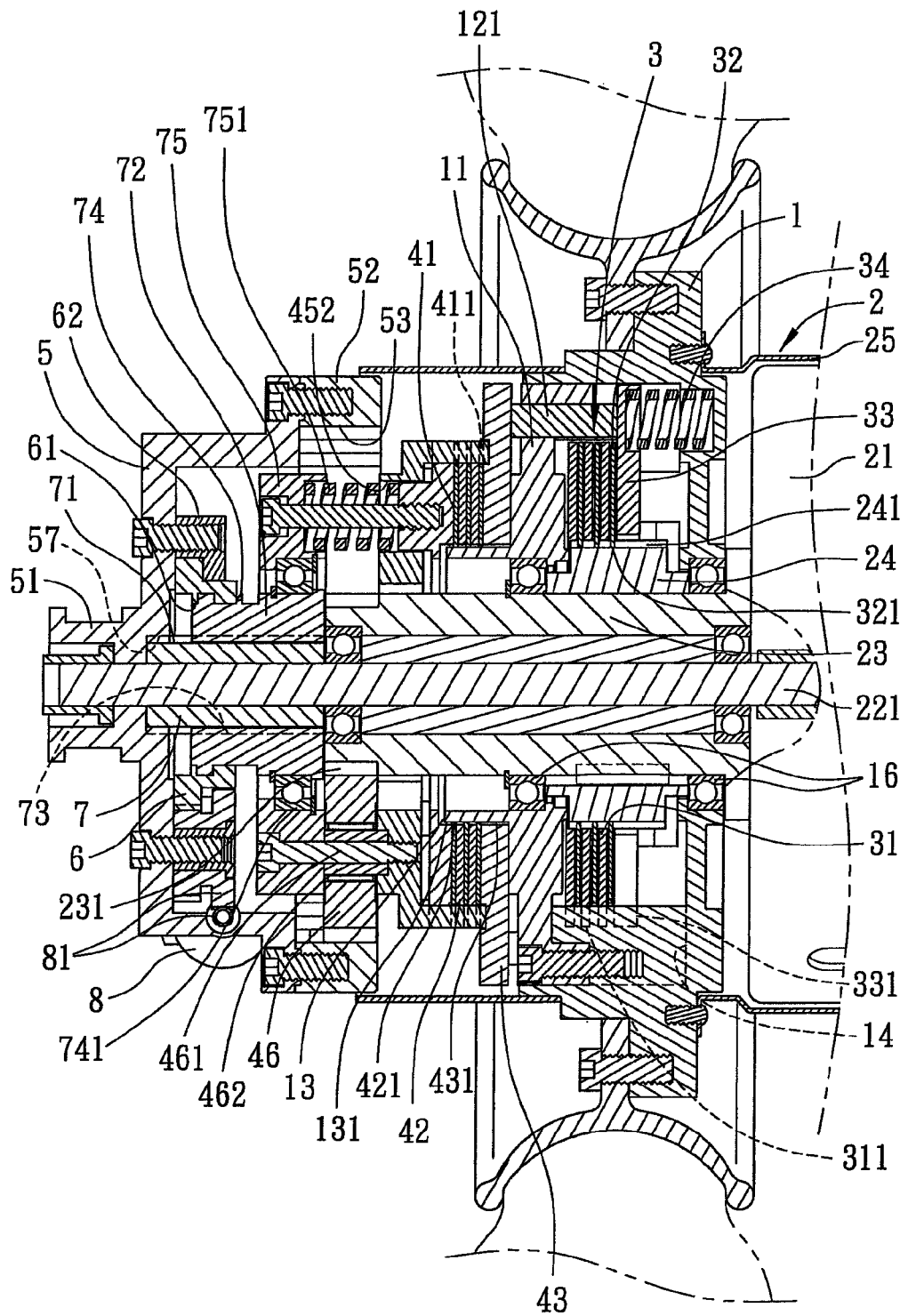
FIG. 5 is a schematic sectional view of the driving system for electric vehicle in accordance with the present invention, illustrating the reducing clutch and the planet gears rotated with the rotor of the vehicle motor and the wheel hub.
Figure 8:
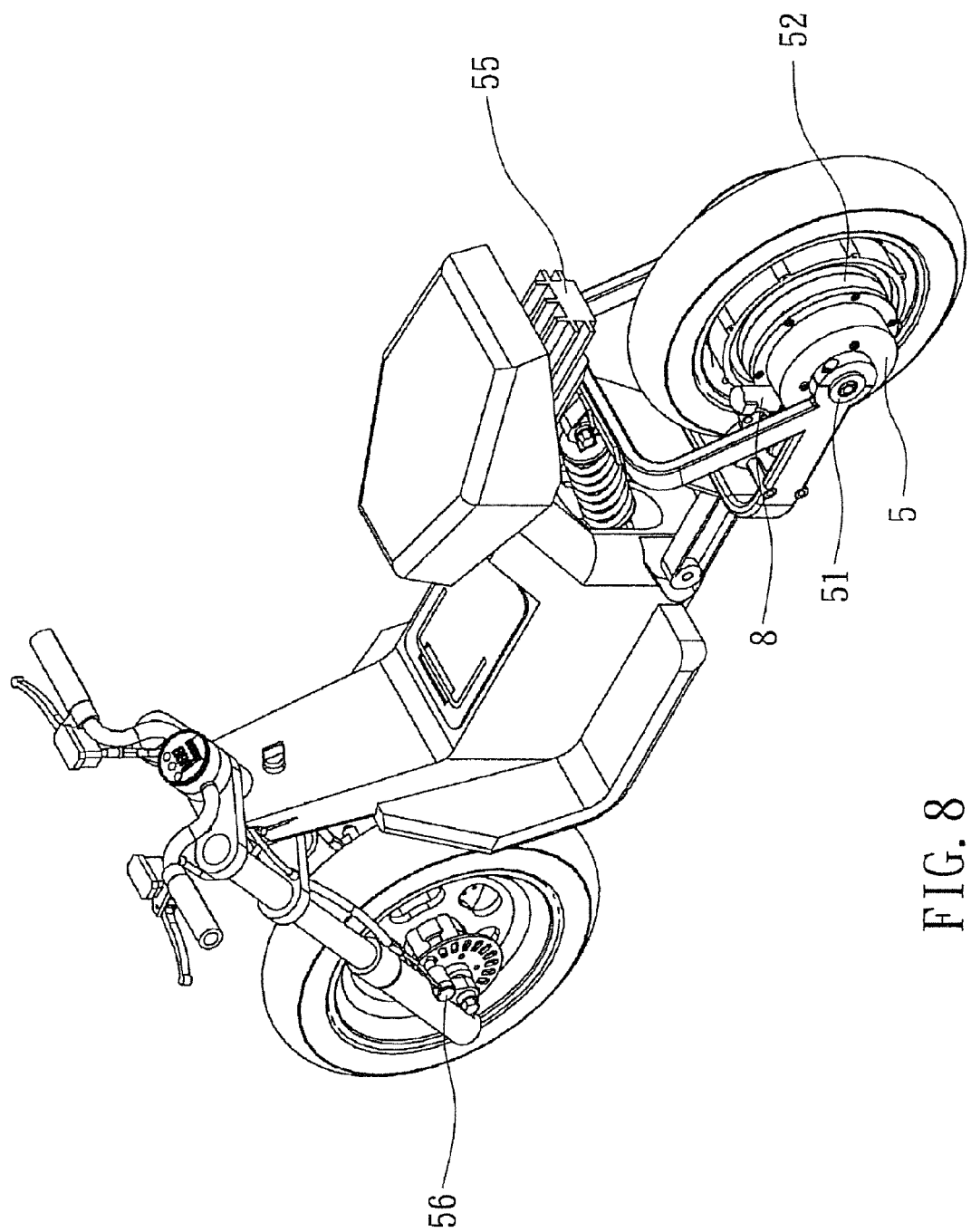
FIG. 8 is an applied view of the present invention, illustrating the driving system installed in an electric motorcycle.
Figure 9:
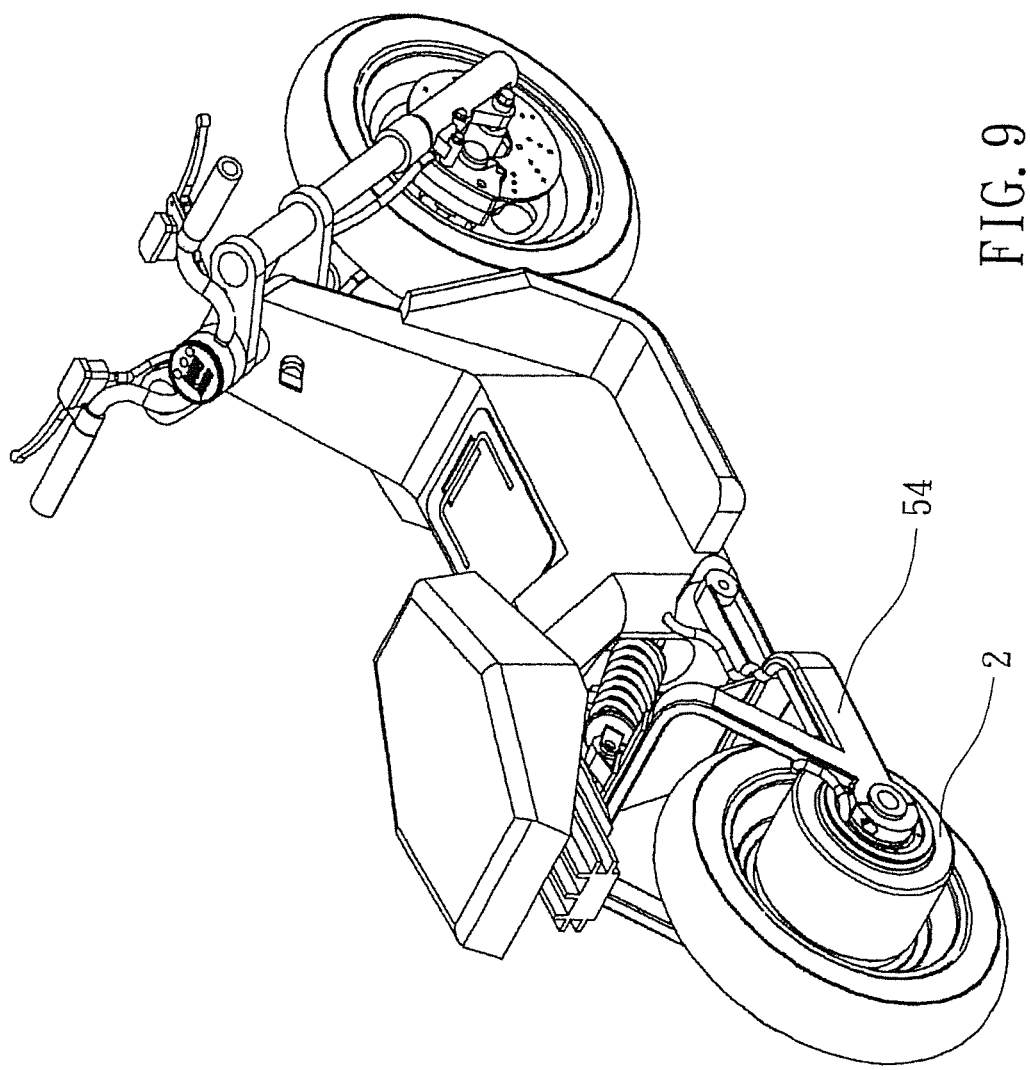
FIG. 9 corresponds to FIG. 8 when viewed from another angle.
Figure 10:
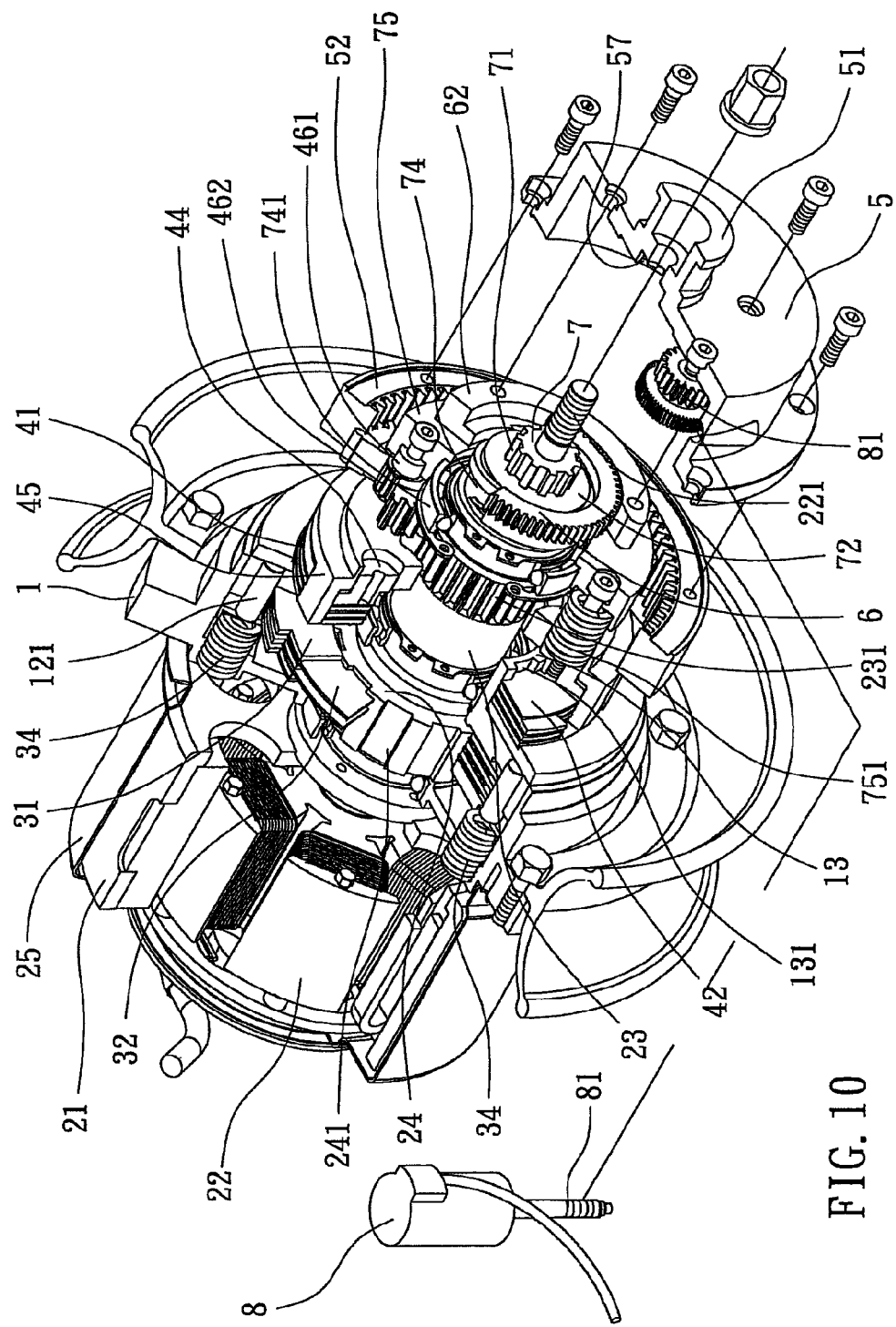
FIG. 10 is a sectional elevational view of the driving system for electric vehicle in accordance with the present invention.
Figure 11:
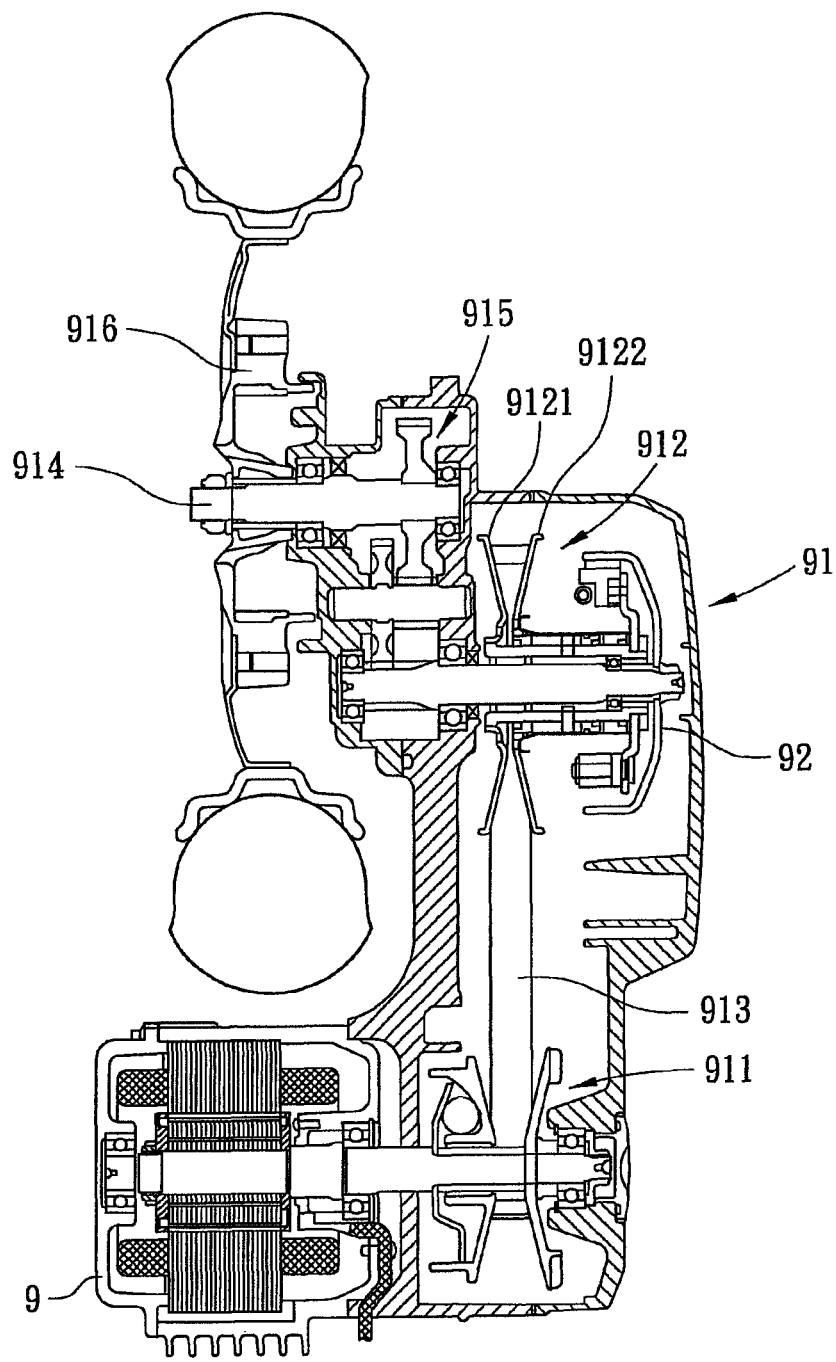
FIG. 11 is a sectional view of a driving system for electric vehicle according to the prior art.

When the electric vehicle is started, stopped or shifted to a low-speed mode, the speed sensor 56 senses the speed and gives a signal to the control circuit 55, causing the control circuit 55 to drive the clutch switching unit in switching on the reducing clutch 4 and the planet gear holder 45 (see FIGS. 8 and 9), and therefore the wheel hub 1 provides a low-speed high-torque output (see FIG. 5). Thus, the electric vehicle can be started efficiently, run over a steep slope, or carry a heavy load. When a cruising or high speed is needed, switch the vehicle motor 2 to drive the wheel hub 1 directly, lowering the torque and increasing the speed with less power consumption.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A driving system used in an electric vehicle, comprising:
a wheel hub defining therein an accommodation space;
a vehicle motor mounted in one side of said wheel hub, said vehicle motor comprising a rotor, and a stator having an axle inserted through the center of said wheel hub;
a bushing sleeved onto said axle of said stator and rotatably supported on said axle by axle bearings;
a pinion rotatably supported on said axle of said stator and connected to one end of said bushing;
a driving wheel fixedly mounted on said bushing for synchronous rotation, said driving wheel having a plurality of transverse grooves spaced around the periphery thereof;
a hubcap fastened to an opposite side of said wheel hub, said hubcap having an annular flange protruded from an outside wall thereof opposite to said wheel hub;
a direct-drive active clutch mounted in the accommodation space inside said wheel hub;
a switching push-pull plate mounted on the annular flange of said hubcap;
a reducing clutch mounted on the annular flange of said hubcap at one side relative to said switching push-pull plate;
a planet gear holder disposed at one side relative to said switching push-pull plate for enabling said reducing clutch to be set in between said planet gear holder and said switching push-pull plate;
a plurality of planet gears equiangularly and pivotally mounted on said planet gear holder and meshed with said pinion;
an outer cover covered on said wheel hub over said hubcap;
a clutch switching unit mounted in said outer cover and adapted for selectively switching said switching push-pull plate and said direct-drive active clutch; and
a tooth ring mounted inside said outer cover, said tooth ring comprising an internal gear meshed with said planet gears for enabling said planet gears to reduce the output speed of said vehicle motor and increase the output torque thereof.

2. The driving system as claimed in claim 1, wherein said wheel hub and said hubcap are rotatably supported on said bushing by axle bearings.

3. The driving system as claimed in claim 1, wherein said wheel hub comprises an internal toothed engagement portion; said direct-drive active clutch comprises a clutch drive plate, a clutch driven plate, a first clutch presser plate and associating spring members, said clutch drive plate having a plurality of radially extending peripheral teeth meshed with said internal toothed engagement portion of said wheel hub, said clutch driven plate being set between said clutch drive plate and said first clutch presser plate and having a plurality of inner teeth respectively engaged into the transverse grooves of said driving wheel, said first clutch presser plate having a plurality of radially extending peripheral teeth meshed with said internal toothed engagement portion of said wheel hub, the spring members of said direct-drive active clutch being equiangularly mounted in said wheel hub to impart a pressure to said first clutch presser plate toward said clutch driven plate.

4. The driving system as claimed in claim 1, wherein said annular flange of said hubcap comprises a plurality of transverse groove equiangularly spaced around the periphery thereof; said planet gear holder comprises a toothed engagement portion; said reducing clutch comprises a clutch drive plate, a clutch driven plate and a second clutch presser plate, said clutch driven plate comprising a plurality of inner teeth respectively engaged into the transverse grooves of said annular flange of said hubcap, said clutch drive plate and said second clutch presser plate each comprising a plurality of radially extending peripheral teeth respectively meshed with said toothed engagement portion of said planet gear holder for synchronous rotation.

5. The driving system as claimed in claim 1, wherein said outer cover comprises an external mounting portion affixed to a vehicle frame of said electric vehicle.

6. The driving system as claimed in claim 1, wherein said planet gear holder comprises a plurality of equiangularly spaced through holes; said clutch switching unit comprises a clutch motor, a worm gear set, a constraint member, a sliding guide sleeve, a cylindrical sliding member, an axial drive gear, a push-pull plate and a plurality of spring members, said sliding guide sleeve being fixedly mounted on the axle of said stator of said vehicle motor, said sliding guide sleeve being connected to said outer cover and having a plurality of longitudinal grooves equiangularly spaced around the periphery thereof, said axial drive gearing being mounted in said constraint member inside said outer cover and having an inner thread, said cylindrical sliding member being axially slidably mounted on said sliding guide sleeve and having a plurality of longitudinal ribs respectively slidably coupled to the longitudinal grooves of said sliding guide sleeve and an outer thread spirally extending around the periphery thereof and meshed with the inner thread of said axial drive gear, said push-pull plate being mounted on said cylindrical sliding member by an axle bearing and a retainer, the spring members of said clutch switching unit being inserted through equiangularly spaced through holes of said planet gear holder and stopped between the push-pull plate of said clutch switching unit and said second clutch presser plate such that when said electric vehicle is started, said cylindrical sliding member is moved toward said hubcap to the extent subject to a predetermined setting, causing said push-pull plate to move said planet gears, said planet gear holder and the spring members of said clutch switching unit in forcing said reducing clutch into engagement with said hubcap to turn said wheel hub to a deceleration driving status; when said rotor of said vehicle motor rotates said bushing as said wheel hub is in a deceleration driving status, said pinion is meshed with said planet gears that are also meshed with the internal gear of said tooth ring, thus, said planet gears are rotated in one same direction between said tooth ring and said pinion for enabling said wheel hub to provide the desired low-speed high-torque output, and therefore said electric vehicle is started with low power consumption; when said axial drive gear is rotated, said cylindrical sliding member is forced to move said push-pull plate toward said outer cover, and therefore said reducing clutch is released from the pressure of the associating spring members, and at this time, said first clutch presser plate of said direct-drive active clutch is compressed by the associating spring members, allowing said wheel hub to be rotated by said vehicle motor directly, thereby accelerating the speed of said electric vehicle.

7. The driving system as claimed in claim 6, wherein said outer cover comprises grooved positioning portion; said sliding guide sleeve has a toothed end engaged into the grooved positioning portion of said outer cover.

8. The driving system as claimed in claim 6, further comprising a control circuit, and a speed sensor adapted to sense the revolving speed of said electric vehicle and to output a signal to said control circuit for driving said control circuit to turn on said clutch motor in driving said clutch switching unit to pull apart said reducing clutch for enabling said direct-drive active clutch be forced by the associating spring members to let said wheel hub be directly rotated by said rotor of said vehicle motor at a high speed.

* * * * *